Dec. 25, 1923.  
E. ROGERS  
PARACHUTE  
Filed July 5, 1923  
1,478,677  
2 Sheets-Sheet 2

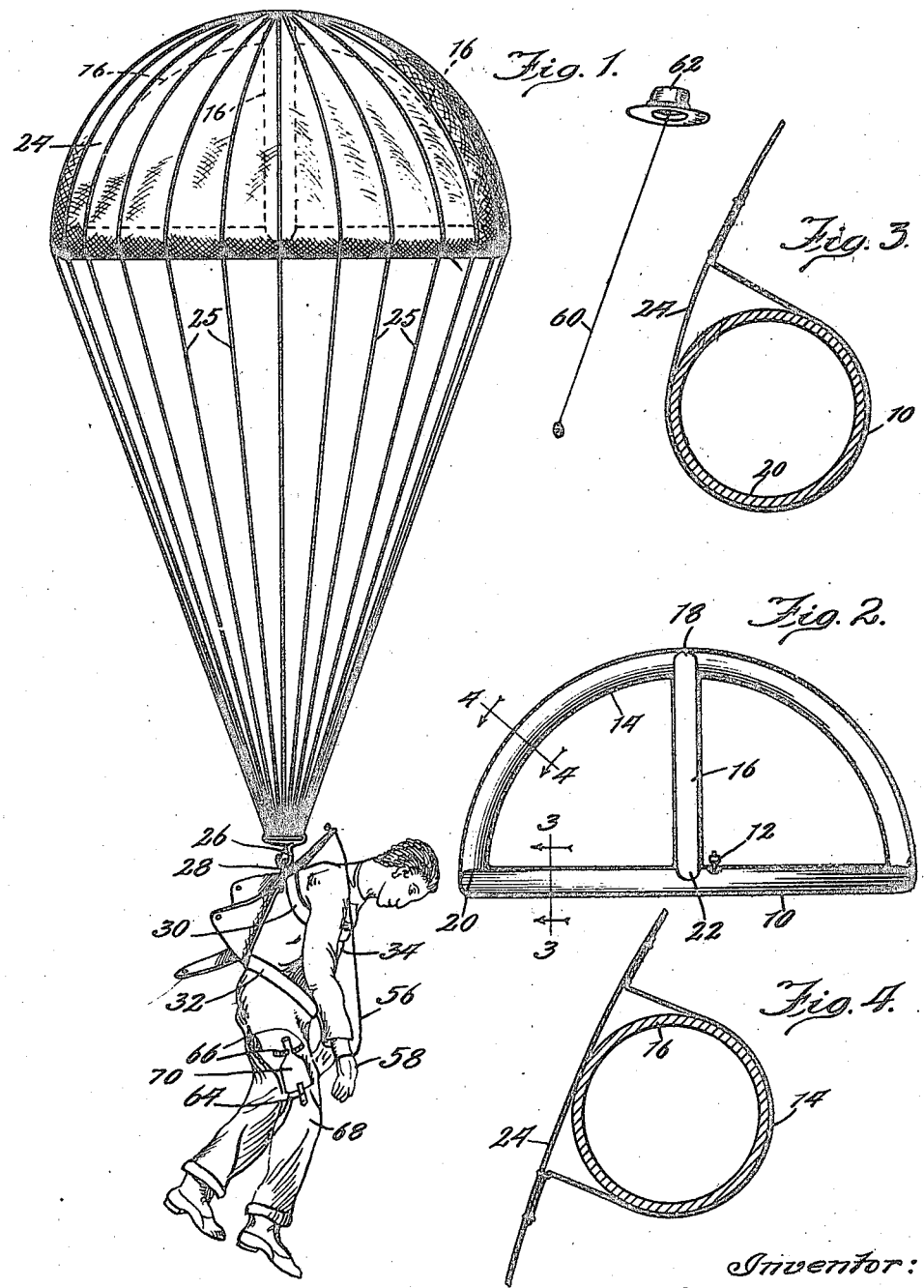

Inventor:  
Edwin Rogers  
By Cheever & Cox  
Attys

Patented Dec. 25, 1923.

1,478,677

UNITED STATES PATENT OFFICE.

EDWIN ROGERS, OF AURORA, ILLINOIS.

PARACHUTE.

Application filed July 5, 1923. Serial No. 649,417.

*To all whom it may concern:*

Be it known that I, EDWIN ROGERS, a citizen of the United States, residing at Aurora, in the county of Kane and State of Illinois, have invented a certain new and useful Improvement in Parachutes, of which the following is a specification.

This invention relates to parachutes for use in safely landing on the ground a person who jumps off or falls off from an aeroplane, balloon or the like.

The object of the invention is to provide a parachute construction which automatically opens in such a positive manner and under such conditions that there is practically no possible danger of the device failing to operate in time to properly protect the persons using the device.

The invention consists in a pneumatic ribbed parachute so shaped that on being released from a confining envelope or sack, the umbrella automatically opens. The invention further consists in an envelope for the parachute, means for securing and opening it which insure the release of the folded parachute under all possible conditions of use. The invention further consists in steering means for use by the parachute user after the parachute opens. The invention finally consists in features and details of construction which will be hereafter fully set forth in the specification and claims.

Referring to the drawings in which like numerals designate the same parts throughout the several views:

Figure 1 is a side view of the parachute of this invention carrying the user through the air.

Figure 2 is a side view of the pneumatic tubes forming the umbrella device in expanded position, the silk covering being shown in section.

Figure 3 is a sectional view on the line 3—3 of Figure 2.

Figure 4 is a sectional view on the line 4—4 of Figure 2.

Figure 5:
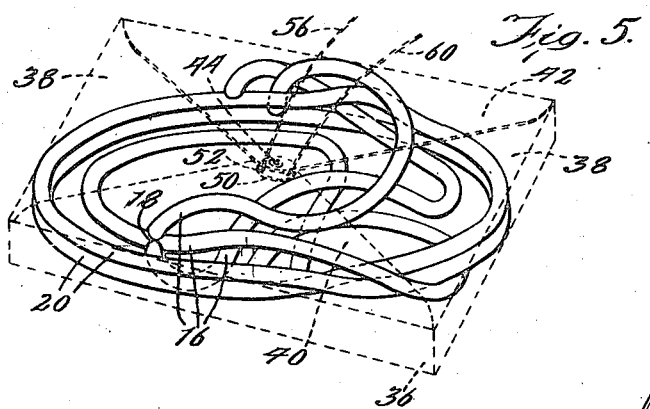
Figure 5 is a perspective view of the envelope containing the folded parachute, the envelope for the purposes of the drawing being made of transparent material so that the pneumatic part of the parachute in folded position is clearly visible. For clearness of illustration, the silk cover and the suspending cords are omitted from this view.
Figure 8:
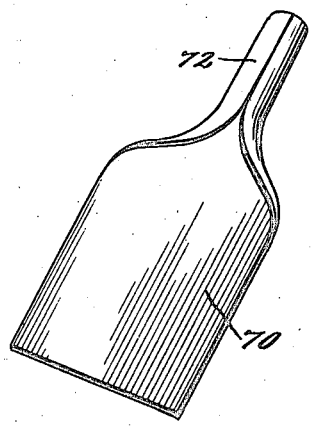
Figure 8 is a perspective view of the steering paddle selectively usable by the parachute passenger.

In constructing the parachute of this invention, a normally horizontally disposed hollow rubber ring 10, not unlike an automobile inner tube, is provided, the same adapted to be filled with air through any suitable valve mechanism 12 of conventional form. This ring 10 is bridged by a continuous semi-circular hollow tube 14 occupying a plane through one diameter of the ring 10 and by another corresponding hollow tube 16 occupying a plane at right angles thereto, the two tubes 14 and 16 inter-communicating with each other at their common point 18 and communicating with the tube 10 at their respective ends 20 and 22, as shown, the result being that when air is pumped into the device through valve 12, this tube framework will assume the umbrella shape form shown in detail in Figure 2 and in dotted lines of Figure 1. This pneumatic umbrella is covered with suitable material such as silk 24 in conventional manner, which silk cover carries on its outside the conventional suspending cord device 25, provided at its lower end with a snap hook 26 adapted to receive any load which is to be carried by the parachute.

In practical operation, this hook 26 engages a ring 28 on a harness 30—32 about the body 34 of the aviator or other user of the device, thereby sustaining the user in conventional manner substantially as shown in the drawing.

Figure 6:
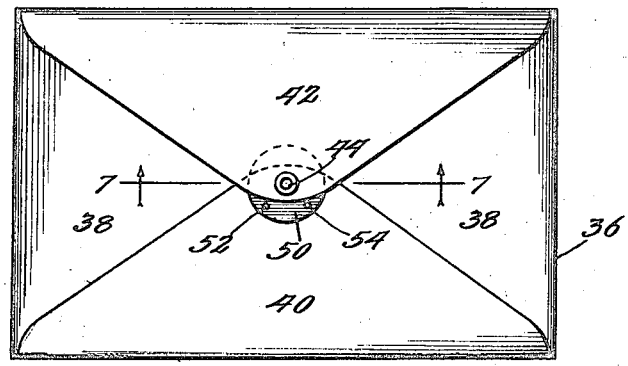
Figure 6 is a plan view of the parachute containing envelope as it appears in enclosed position on the back of the user.
Figure 7:
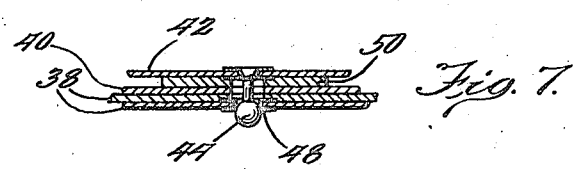
Figure 7 is a sectional view on the line 7—7 of Figure 6.

When the parachute is not in use, it is folded up as shown in Figure 5 and enclosed within an envelope or multiple flap sack 36, having its back or solid side perforated so that the ring 28 passes through it and the front flaps 38—40 and 42 can fold over as shown in Figure 6 and be secured together by a conventional form of removable button 44 having its ball end locked with compressible jaw 48 on flap 40.

This button 44 is more or less rigidly secured to a disc 50, more or less rigidly secured to flap 42 of the envelope. In this disc 50 are a plurality of perforations 52 and 54, one of which carries the string 56 adapted to be attached to the hand 58 of the user as shown in Figure 1. The other perforation, as 54, receives a string 60 attached to the hat 62 of the user, the result being that when the operator wearing the parachute folded in the envelope jumps or falls from the moving air vehicle and he moves his hand 58 to pull the string 56, the catch 44 will be released, the envelope will open and the parachute will expand to the position of Figure 1. The same result attains if the operator fails to pull string 56 but his hat 62 blows off thereby forcibly jerking disc 50 with sufficient energy to cause the catch 44 to be released with the tearing of disc 50 from the envelope as indicated in Figure 1.

The operator carries in his pocket or in conventional catch devices 64 and 66 on the trousers leg 68 of the user one or more paddles 70 having handles 72 adapted to be grasped by the user and used in the hands of the user as guiding blades to control the movement of the parachute and its user through the air.

For convenience, the members 10—14—16 will be referred to in some of the claims as "an umbrella frame." The ring 10 will be referred to as "a base" and the members 14 and 16 as "rings."

Having thus described my invention, what I claim as new and desire to secure by Letters Patent is:

1. A parachute closure including an envelope having a multiplicity of flaps secured together by a removable catch 44 carried by a disc 50 secured to the outer flap, there being a pullable member attached to said disc, as shown and described.

2. In combination with a parachute enclosing envelope and a catch therefor, a hat to be worn by a user of the parachute and its envelope, and a connection between said hat and the catch of the envelope for the purposes set forth.

In witness whereof, I have hereunto subscribed my name.

EDWIN ROGERS.